Jan. 27, 1970 — E. A. LINKE — 3,492,618
SPLIT ROTARY ELECTRIC TRANSFORMER
Filed May 7, 1968
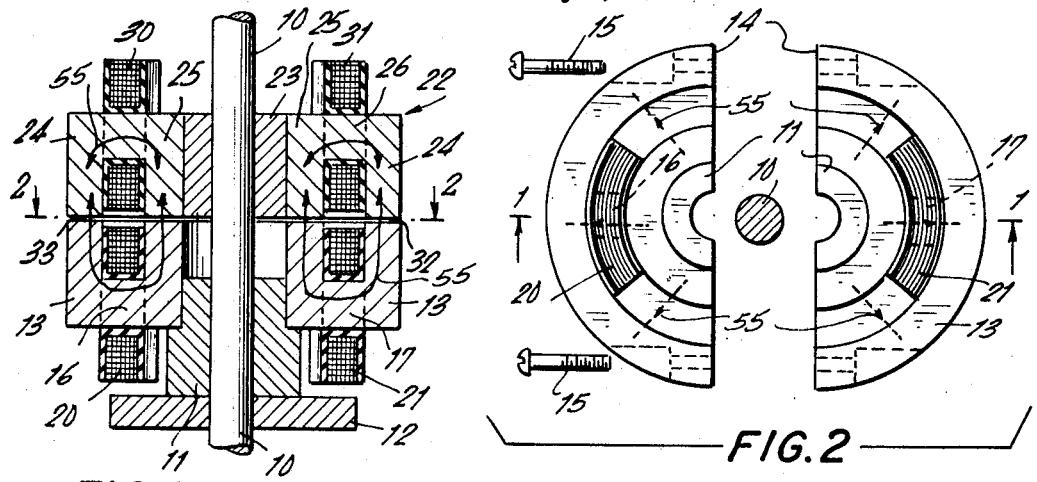
FIG.1
FIG.2
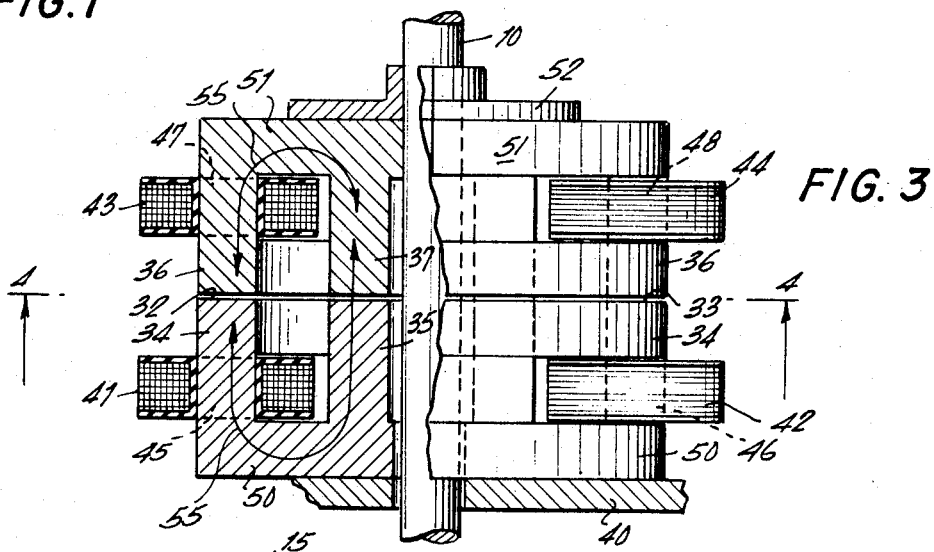
FIG.3
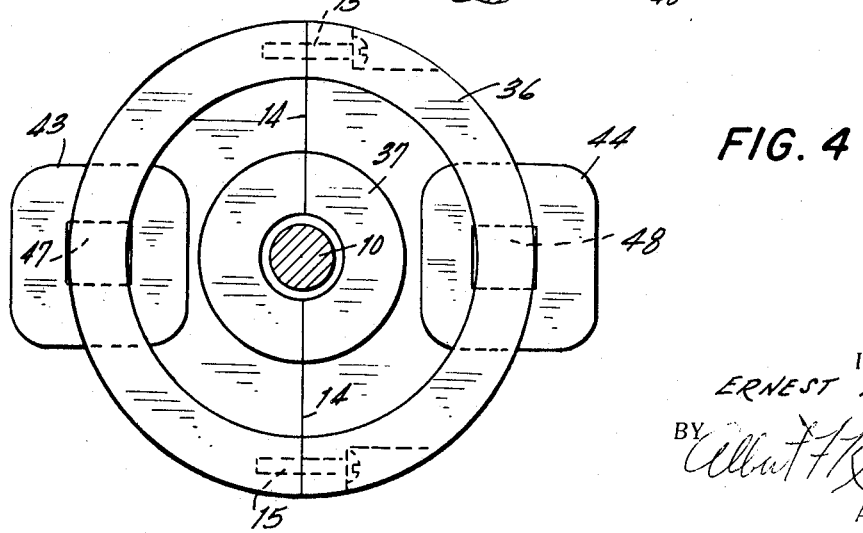
FIG.4
INVENTOR.
ERNEST A. LINKE
BY
ATTORNEY

United States Patent Office 3,492,618
Patented Jan. 27, 1970

3,492,618
SPLIT ROTARY ELECTRIC TRANSFORMER
Ernest A. Linke, Maplewood, N.J., assignor to Breeze Corporations, Inc., Union, N.J., a corporation of New Jersey
Filed May 7, 1968, Ser. No. 727,152
Int. Cl. H01f 21/06
U.S. Cl. 336—120
7 Claims

ABSTRACT OF THE DISCLOSURE

An electric transformer is described having a primary winding on a core secured to a stationary base. The secondary winding is on a core secured to a rotatable shaft. Alternating magnetic flux links the primary and secondary windings through two airgaps which separate two concentric annular core surfaces. Both cores are split so that they may be positioned around the shaft without slipping over the shaft end.

BACKGROUND OF THE INVENTION

Several types of transformers have been developed and used having a primary winding on a stationary support and a secondary winding on a rotatable shaft. All prior art transformers of this type required the insertion of a shaft into one or more windings so that assembly was difficult. The present invention uses split cores, each with one or more windings which can be attached or removed from about a rotatable shaft by assembly or disassembly at the split in each half. Variable inductors have been constructed with stator coils and rotor coils but these instruments, when connected as transformers and rotated, vary the secondary voltage through 180 degrees phase angle, including two zero positions. The transformers described herein transmit a constant voltage from primary to secondary, without altering phase or amplitude as a function of the speed of rotation and can be used to transmit alternating current power when the shaft and the secondary windings are turning or when the shaft is stationary at any angular setting.

One of the features of the present invention is the transmission of alternating current power from a stationary winding to a rotating winding without the use of slip rings, brushes, or sliding contacts of any kind.

For a better understanding of the present invention, together with other details and features thereof, reference is made to the following description taken in connection with the accompanying drawings.

BRIEF DESCRIPTION OF THE FIGURES

FIGURE 1 is a cross sectional view of one form of the invention showing the windings positioned with their axes perpendicular to the shaft axis, FIGURE 2 is a cross sectional somewhat exploded view of the transformer shown in FIGURE 1, and is taken along line 2—2 of that figure, FIGURE 3 is a partial cross sectional view of a second form of the invention with the axes of the windings positioned in parallel alignment to the shaft axis, FIGURE 4 is a cross sectional view of the transformer shown in FIGURE 3 and is taken along line 4—4 of the figure.

DESCRIPTION OF THE PREFERRED EMBODIMENT

The preferred embodiment is shown in FIGURES 1 and 2. It is more compact than the form shown in FIGURES 3 and 4 and has a shorter magnetic flux path. However, both designs can be made to operate with equal efficiency. The shaft 10 revolves in a bearing 11 secured to a base member 12. The primary half of the core 13 is made in two parts which, when bolted together, form two half rings with concentric axes. The two parts can be separated at line 14 and can be clamped together for example, by two screws 15 or by a band (not shown) which encircles the outer ring. When clamped as shown in FIGURE 2, the outer and inner rings are connected to each other only by the two portions of the core 16 and 17 which are encircled by two primary windings 20 and 21. As shown in FIGURES 1 and 2, the primary core portions are clamped to the outside of the shaft bearing but any other means of securing the core to a base structure may be used.

The secondary part 22 of the transformer is secured to the shaft 10 by means of clamping screws similar to screws 15. In FIGURE 1, the core halves are shown clamped to a non-magnetic hollow cylinder 23 in order to keep the alternating magnetic flux from the shaft. However, this cylinder is not always necessary and the core can be attached to the shaft by any other convenient means. The secondary assembly 22 includes an outer core ring 24, an inner core ring 25, and two bridging portions 26. Windings 30 and 31 on portions 25 and 26 complete the secondary assembly.

When the two parts are mounted in correct alignment, the faces of the four annular core rings are separated by two circular air gaps 32 and 33. The smaller these air gaps are, the more efficient the transformer. It should be pointed out that, while the air gaps may be wider than used in many transformers, the air gap surfaces are considerable, extending completely around the shaft and thereby reducing the air gap reluctance to a practical figure.

When alternating current is applied to the stationary windings 20, 21, in series or parallel connection, the windings generate an alternating magnetic flux which moves through the core in the directions shown by the arrows 55. The complete magnetic path for each pair of coils includes two air gaps. The magnetic lines of force around secondary windings 30 and 31 generate voltage in these windings and alternating current power is then available for use by components secured to shaft 11 and which turn with it.

The transformer shown in FIGURES 3 and 4 is similar to that shown in FIGURES 1 and 2 since it has two annular core rings on the primary stationary portion and two matching annular core rings 36 and 37 on the rotatable portion. As before, the stationary portion may be secured to a base 40 shown in section in FIGURE 3. Air gaps 32 and 33 separate the stationary and rotatable core rings, these air gaps being mounted at right angles to the direction of the alternating flux. Stator windings 41 and 42 are mounted on core bridges 45 and 46 and are connected, either in series or parallel, to the source of alternating current power. Secondary windings 43 and 44 are mounted on core bridges 47 and 48 and generate secondary voltage in response to the alternating magnetic flux produced by the primary windings 41, 42. The alternating flux path which links windings 41 and 43 is shown by the arrows in FIGURE 3.

The annular ring 35 is secured to a base core disk 50 and a similar core disk 51 carries the annular ring 37. Rings 36 and 34 are joined to their base disks 50 and 51 only by the bridges on which the windings are mounted. All the cores are made of the usual laminated ferromagnetic material or the sintered low loss powder cores. The rotatable assembly may be secured to shaft 10 by a disk support 52 but the preferred manner includes two clamping screws 15 (FIGURE 4) which secure two halves of the rotatable assembly divided along line 14. In this embodiment, like the first, the air gaps 32, 33 extend completely around the shaft to create a gap of extended area and reduced reluctance.

In the above description the stationary portion has been called the primary and the rotatable portion the secondary. It is obvious that the primary and secondary windings can be interchanged.

Having thus fully described the invention, what is claimed as new and desired to be secured by Letters Patent of the United States, is:

1. A split rotary electric transformer for transferring alternating current power from a stationary portion to a rotatable portion comprising:
   (a) an annular ferromagnetic stator core including outer and inner concentric rings secured to a base,
   (b) A plurality of ferromagnetic core bridges joining the two stator rings to retain them in their relative positions, and provide flux path linking coils,
   (c) a plurality of stator windings, one surrounding each of said bridges, for generating magnetic flux in the two rings,
   (d) an annular ferromagnetic rotor core including outer and inner rings secured to a rotatable shaft which is in axial alignment with the stator and rotor rings,
   (e) A plurality of ferromagnetic rotor core bridges joining the two rotor rings to retain them in their relative positions, and provide flux path linking coils,
   (f) a plurality of rotor windings, one surrounding each of said rotor core bridges for generating an alternating current in the windings whenever alternating current flux is received from the first core,
   (g) and structural means for mounting stator and rotor cores adjacent to each other so that an air gap separates the outer stator ring from the outer rotor ring, and a similar air gap separates the inner stator ring from the inner rotor ring.

2. A rotary transformer as claimed in claim 1 wherein the axes of said windings are disposed at right angles to the shaft axis.

3. A rotary transformer as claimed in claim 1 wherein the axes of said windings are disposed in parallel alignment with the shaft axis.

4. A rotary transformer as claimed in claim 1 wherein the air gaps between the two outer rings and the two inner rings are in a single plane perpendicular to the shaft axis.

5. A rotary transformer as claimed in claim 1 wherein the windings on the stator and rotor cores are equally spaced around the periphery of the outer rings.

6. A rotary transformer as claimed in claim 1 wherein both the stator core and the rotor core are made in at least two equal parts for ease in assembly about the rotary shaft, said parts secured to each other by mechanical fastening means.

7. A rotary transformer as claimed in claim 1 wherein a plurality of windings are mounted on the rotor cores to produce a plurality of secondary load circuits.

References Cited

UNITED STATES PATENTS

| | | | |
|---|---|---|---|
| Re. 26,501 | 12/1968 | Himmelstein et al. | 336—120 |
| 2,585,050 | 2/1952 | Simon | 336—120 XR |
| 3,273,096 | 9/1966 | Lipshutz | 336—135 XR |
| 2,838,737 | 6/1958 | Duncan | 336—120 |

FOREIGN PATENTS 224,976  1924  Great Britain.

THOMAS J. KOZMA, Primary Examiner